US012410047B2

(12) United States Patent
Melkonian et al.

(10) Patent No.: US 12,410,047 B2
(45) Date of Patent: Sep. 9, 2025

(54) BOTTOM LOAD WATER DISPENSER WITH AN ELONGATED DISPENSING AREA

(71) Applicant: Brio Water Technology, Inc., City of Industry, CA (US)

(72) Inventors: Arman Melkonian, La Cañada Flintridge, CA (US); Mark Melkonian, Northridge, CA (US); Ryan Nguyen, Westminster, CA (US)

(73) Assignee: Brio Water Technology, Inc., City of Industry, CA (US)

( * ) Notice: Subject to any disclaimer, the term of this patent is extended or adjusted under 35 U.S.C. 154(b) by 234 days.

(21) Appl. No.: 18/450,154

(22) Filed: Aug. 15, 2023

(65) Prior Publication Data

US 2025/0059016 A1 Feb. 20, 2025

(51) Int. Cl.
*B67D 1/00* (2006.01)
*B67D 1/08* (2006.01)
*B67D 1/16* (2006.01)

(52) U.S. Cl.
CPC ......... *B67D 1/0004* (2013.01); *B67D 1/0872* (2013.01); *B67D 1/0891* (2013.01); *B67D 1/16* (2013.01); *B67D 2001/0812* (2013.01)

(58) Field of Classification Search
CPC .. B67D 1/0004; B67D 1/0872; B67D 1/0891; B67D 1/16; B67D 2001/0812; B67D 2210/00041; B67D 1/0801; B67D 1/0857
See application file for complete search history.

(56) References Cited

U.S. PATENT DOCUMENTS 4,081,134 A 3/1978 Anderson
6,056,154 A 5/2000 Fowler
6,453,955 B1 9/2002 Lee
6,962,319 B2 11/2005 Zheng
7,434,603 B2 10/2008 Spear et al.
10,858,234 B1 * 12/2020 Rubin .................. B67D 1/1247
2005/0194404 A1 9/2005 Perdue
2008/0014064 A1 1/2008 Dixon
2009/0159154 A1 6/2009 Buchstab et al.
2009/0242585 A1 10/2009 Wang et al.
2010/0252570 A1 10/2010 Yui
2014/0131385 A1 5/2014 Yui et al.
2016/0236926 A1 * 8/2016 Leyva ...................... B67D 1/04
2017/0233236 A1 8/2017 Shen
2018/0100693 A1 * 4/2018 Qiu ...................... B67D 1/0891

FOREIGN PATENT DOCUMENTS

CN 213551247 U 6/2021
CN 214484245 U 10/2021
GB 2133086 A * 7/1984 ........... B67D 1/0021

* cited by examiner

*Primary Examiner* — Donnell A Long
(74) *Attorney, Agent, or Firm* — Foundation Law Group LLP

(57) ABSTRACT

A bottom loaded water dispenser having a water dispensing area that can be elongated to accommodate any size refillable bottle or other container, including large or wide based bottles or refillable containers. The bottom loaded water dispenser accommodates a standard bottom loaded water bottle. The bottom loaded water dispenser has a door that fits into the recess of the dispenser housing that does not interfere with bottom loaded water bottle and allows the drip tray to be adjusted to any height under the dispensing nozzle.

18 Claims, 11 Drawing Sheets

BOTTOM LOAD WATER DISPENSER WITH AN ELONGATED DISPENSING AREA

BACKGROUND

Water dispensers have been available for quite some time. Early versions of such dispensers were "top loaded" dispensers, which are still in use today. The top loaded configuration is cumbersome and requires a person to lift a heavy bottle of water, flip it and position it in the top of the water dispenser. Because of this, often, a person changing the water bottle can spill the water; can be injured or considerably strain a muscle, and when the heavy bottle is not properly loaded because it is difficult to control, the flipped bottle may damage the water dispenser.

"Bottom loaded" dispensers were developed to address many of the issues caused by top loaded dispensers. Over time, due to standardization of components and height requirements, legal requirements and to reduce costs, bottom loaded dispensers are now designed and built to meet certain, pre-defined specifications. For instance, the 5-gallon water bottle and its defined shape and size have become an industry standard. So, the bottom loaded water cooler needs to accommodate its shape and size. Modern water coolers must comply with the American Disabilities Act ("ADA") and meet certain specifications, such as the controls on the front of the unit must be within the range of 15 inches to 48 inches from the floor to accommodate someone in a wheelchair that wants to use the water dispenser. Further, to make it more efficient and cost-effective to transport multiple water dispensers, water dispensers are sized to get to get the maximum number of water dispensers in a shipping container. Because of the limitations a bottom loaded water dispenser needs to satisfy, a bottom loaded water dispenser on the market today typically has a height in the 48 inch to 52 inch range.

In prior designs, in addition to the top height constraints on a bottom loaded water dispenser discussed above, the drip tray was set at a height on the water cooler higher than the top most height of the 5-gallon water bottle to allow the water bottle to be easily moved in and out for replacement. With these prior designs, the top height limitation of the cooler itself and the minimum height that the drip tray can be placed on the cooler, due to the standardized 5-gallon water bottle height, created a "maximum dispensing height" on a bottom loaded water dispenser for a bottle or container that can filled by the dispenser. Such limitations are acknowledged and commented on in US2014/0131385, par. 0035.

However, over time, people have become more health conscious and with this, they drink more water during the course of the day. As a result, people are using taller refillable bottles and containers than they did in the past. These refillable taller bottles and containers do not fit in the present "maximum dispensing height" between the dispensing nozzles and the drip tray of a bottom loaded water dispenser. Re-designing the water dispenser to keep the drip tray on the door while moving the position of drip tray down on the door to elongate the dispensing height and create a larger "maximum dispensing height" is not practical because it would create an unaesthetically pleasing seam where the door engages the water dispenser housing, since the housing has to have an opening tall enough to insert and remove a 5-gallon water bottle.

Accordingly, there is a need for an aesthetically pleasing bottom loaded water dispenser that can accommodate refillable bottles and containers of varying heights within the present build constraints of a bottom loaded water dispenser.

SUMMARY

According to one aspect of the present invention, a bottom loaded water dispenser with an elongated dispensing area, having a housing which includes a dispensing nozzle, a front side and a lower portion and where the nozzle has an end tip and where a recess is formed in the front side of the housing behind the dispensing nozzle and below the dispensing nozzle end tip and where an opening is formed in the lower portion of the housing to receive a water bottle and also having a door connected to the housing having a drip tray; where the door is moveable between an open and closed position and where the recess formed in the front side of the housing is approximately equal to the thickness of the door, such that in the closed position, the door fits in the recess and the top of the door is below the end tip of the dispensing nozzle. The bottom loaded water dispenser of the present invention may also have an adjustable drip tray. The bottom loaded water dispenser of the present invention may also include a lower lip portion that defines the top of the formed recess and abuts the top of the door in the closed position, and the lower lip portion may be separate from the other housing components. The bottom loaded water dispenser of the present invention may have a door that connects to the housing with hinges, and the door may also be curved. The bottom loaded water dispenser of the present invention may also include an access panel in the housing.

DRAWINGS

Objects, features, and advantages of the present invention will become apparent upon reading the following description in conjunction with the drawing figures, in which.

DESCRIPTION

Figure 1A:
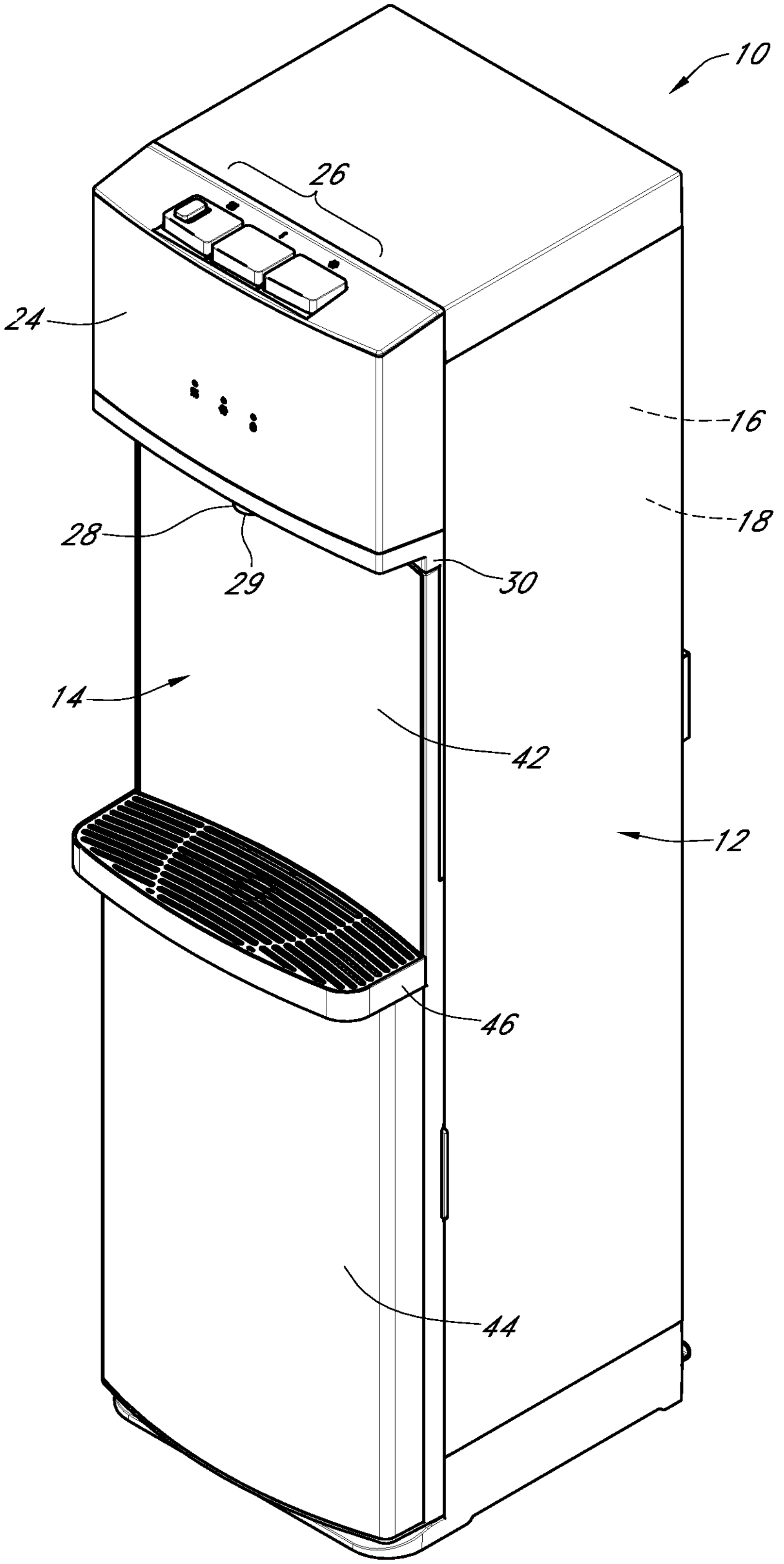
FIG. 1A is a perspective view of a bottom loaded water dispenser of the present invention with a door closed.
Figure 1B:
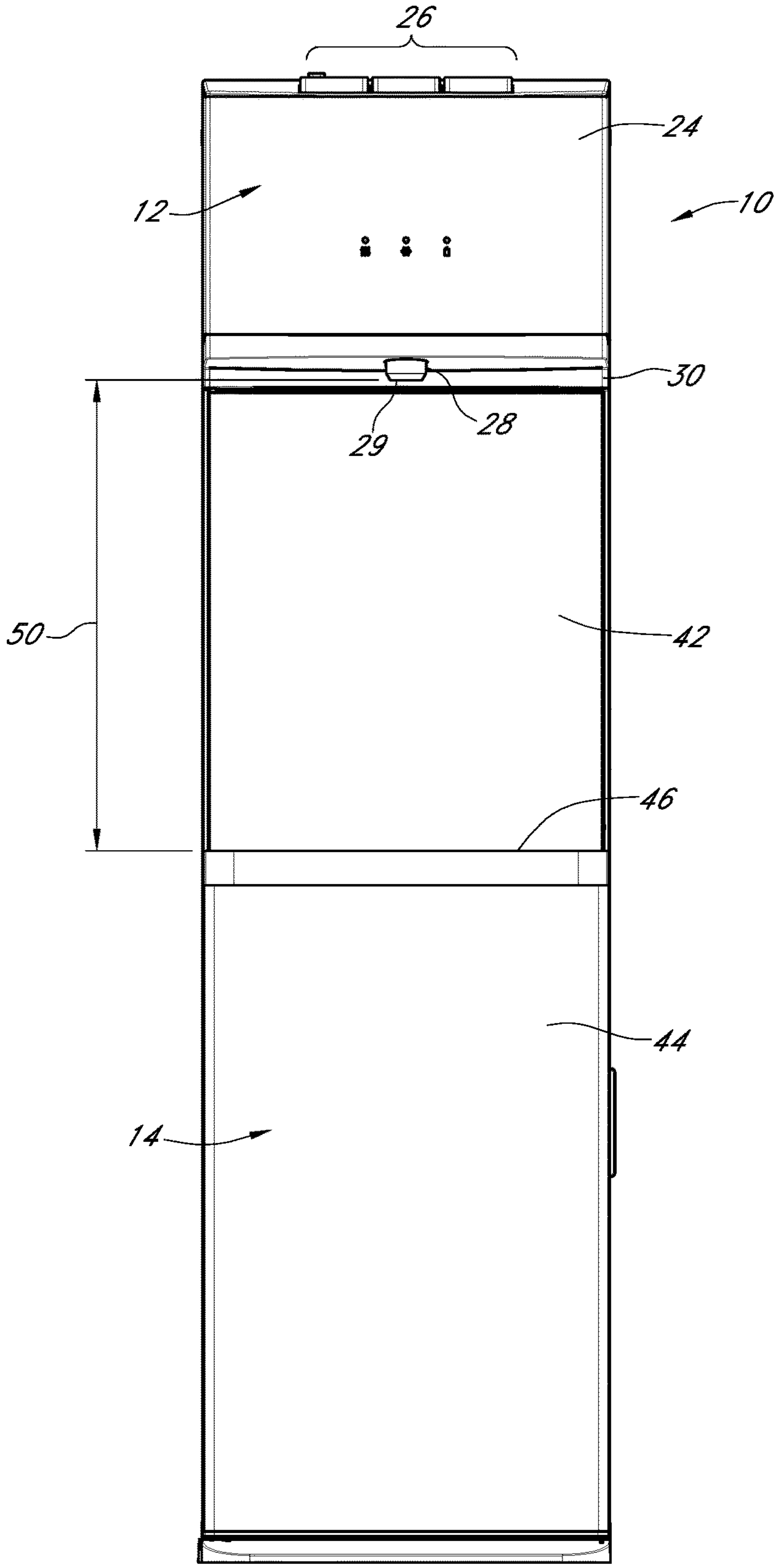
FIG. 1B is a front view of a bottom loaded water dispenser of the present invention with a door closed.

Referring to FIGS. 1A, 1B, an embodiment of a bottom loaded water dispenser 10 of the present invention is depicted. The water dispenser 10 includes a housing 12 and a door 14. The housing 12 contains the operating components 16 (FIG. 6B) of the water dispenser 10 in an upper interior space 18. The housing 12 also defines a lower interior space 20 (FIGS. 2A, 2B), which accommodates a water bottle 22 when a water bottle is loaded into the water dispenser 10. The lower interior space 20 has a height, width and depth large enough to accept an inserted water bottle 22. The housing 12 also includes a water dispensing housing 24 that houses water dispensing buttons 26 and one or more dispensing nozzles 28. The housing 12 also includes a lower lip portion 30 that is set along the base of the water dispensing housing 24. In differing embodiments, the lower lip portion 30 can be formed integral with the water dispensing housing 24, be formed as a separate, stand-alone component or be formed integral with another component of the water dispenser 10 of the present invention. In this embodiment, the dispensing nozzles 28 each have an end tip 29, which is the lowest point of the dispensing nozzle 28 relative to the ground. The dispensing buttons 26 interact with the operating components 16 to dispense water to a user through the dispensing nozzle 28 when the buttons 26 are pushed.

In this embodiment, the door 14 of the water dispenser 10 is separate from the housing 12 and is connected to the housing 12. The door 14 is connected to the housing 12 with hinges (not shown) in this embodiment. Referring to FIGS. 2A-B, 3 and 4, in a preferred embodiment, the lower lip portion 30 defines the top of a recess 40 so that the door 14, when engaged with the front of the housing 12 in a closed position, fits in the recess 40 defined on the front of the housing 12 under the lower lip portion 30. The lower lip portion 30, and the recess 40 that it forms the top of, are approximately equal to the thickness of the door 14 so that the door 14, when closed, fits cleanly within the recess 40 and does not extend out from underneath the lower lip portion 30. Further, the lower lip portion 30 is positioned at a position lower than the end tip 29 of a dispensing nozzle 28. Placing the lower lip portion 30 at this position on the dispenser 10 keeps the dispensing nozzle 28 from interfering with the opening and closing of the door 14.

Referring again to FIGS. 1A-1B and 2A-2B, the door 14 and the recess 40 are designed so that a water bottle 22 can fit entirely within the interior space 20 without interfering with closing the door 14. The door 14 includes a base portion 42, a front bottom portion 44 and a drip tray 46. In the embodiment depicted, the base portion 42 extends the entire length of the door 14 behind the front bottom portion 44. In other embodiments, the base portion 42 might not extend the entire length of the door 14, and the front bottom portion 44 would engage with the housing 12 when the door 14 is closed.

Since the drip tray 46 is connected to the door 14, and the door 14 is the full length of the recess 40 in the housing 12, the drip tray 46 can be placed anywhere along the face of the door 14 to create an elongated dispensing height 50 (FIG. 1B) that can accommodate any size refillable bottle or containers, including very tall bottles or containers. Thus, a water dispenser 10 of the present invention can have a significantly large "maximum dispensing height" compared to prior water coolers, and the "maximum dispensing height", can, in theory, be set to span from the bottom of the end tip 29 of the dispensing nozzle 28 all the way to the bottom of the housing 12, if a user wanted a dispensing height 50 that large. As such, the elongated dispensing height 50 in preferred embodiments of the present invention is much larger than the present maximum dispensing height used in the industry. In particular, the drip tray height, and correlated dispensing height 50, in the present invention are not limited by the seam formed at the top of the interior space 20, which has to be tall enough to accommodate a water bottle 20.

Figure 2A:
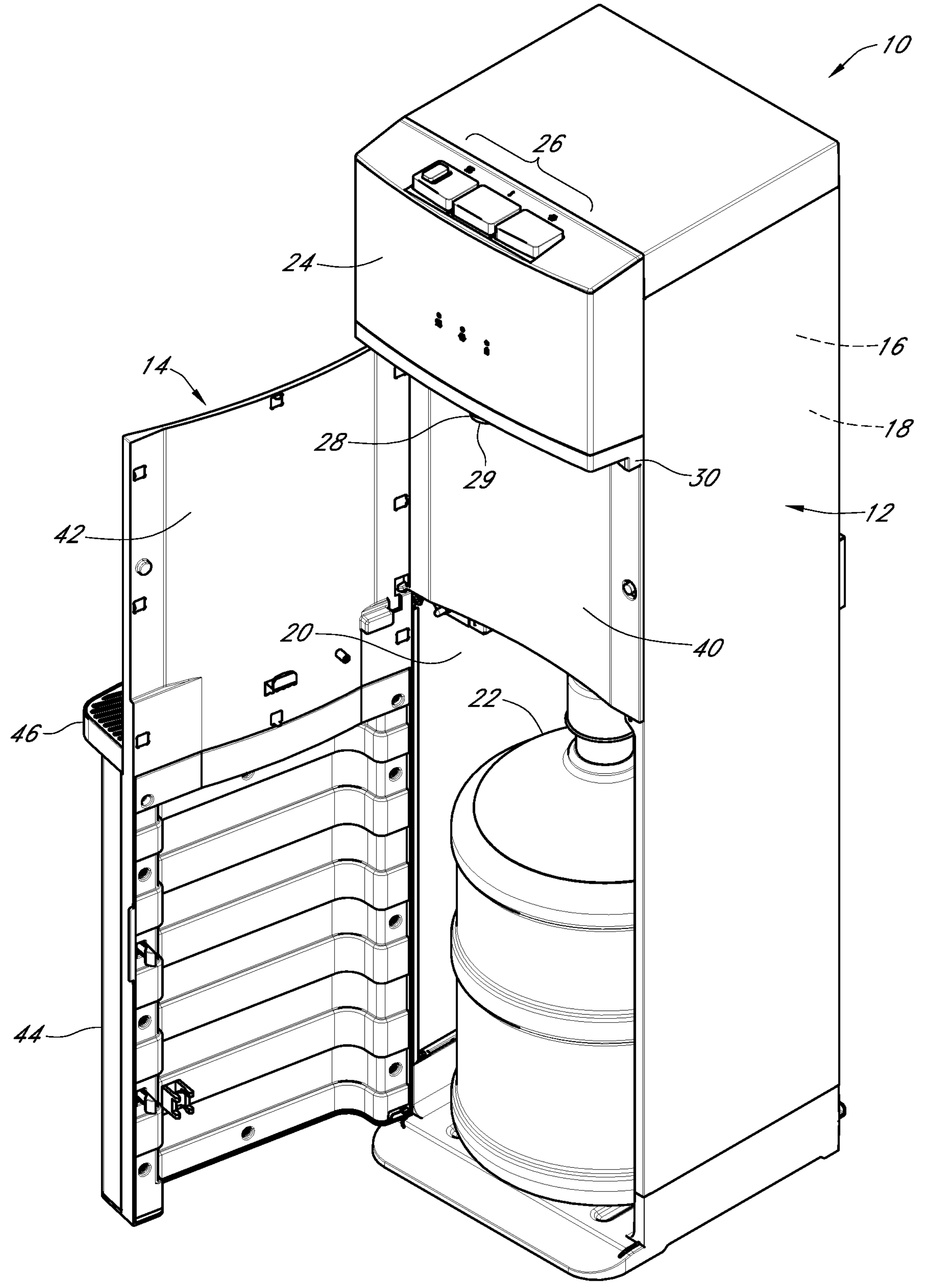
FIG. 2A is a perspective view of a bottom loaded water dispenser of the present invention with the door open.
Figure 2B:
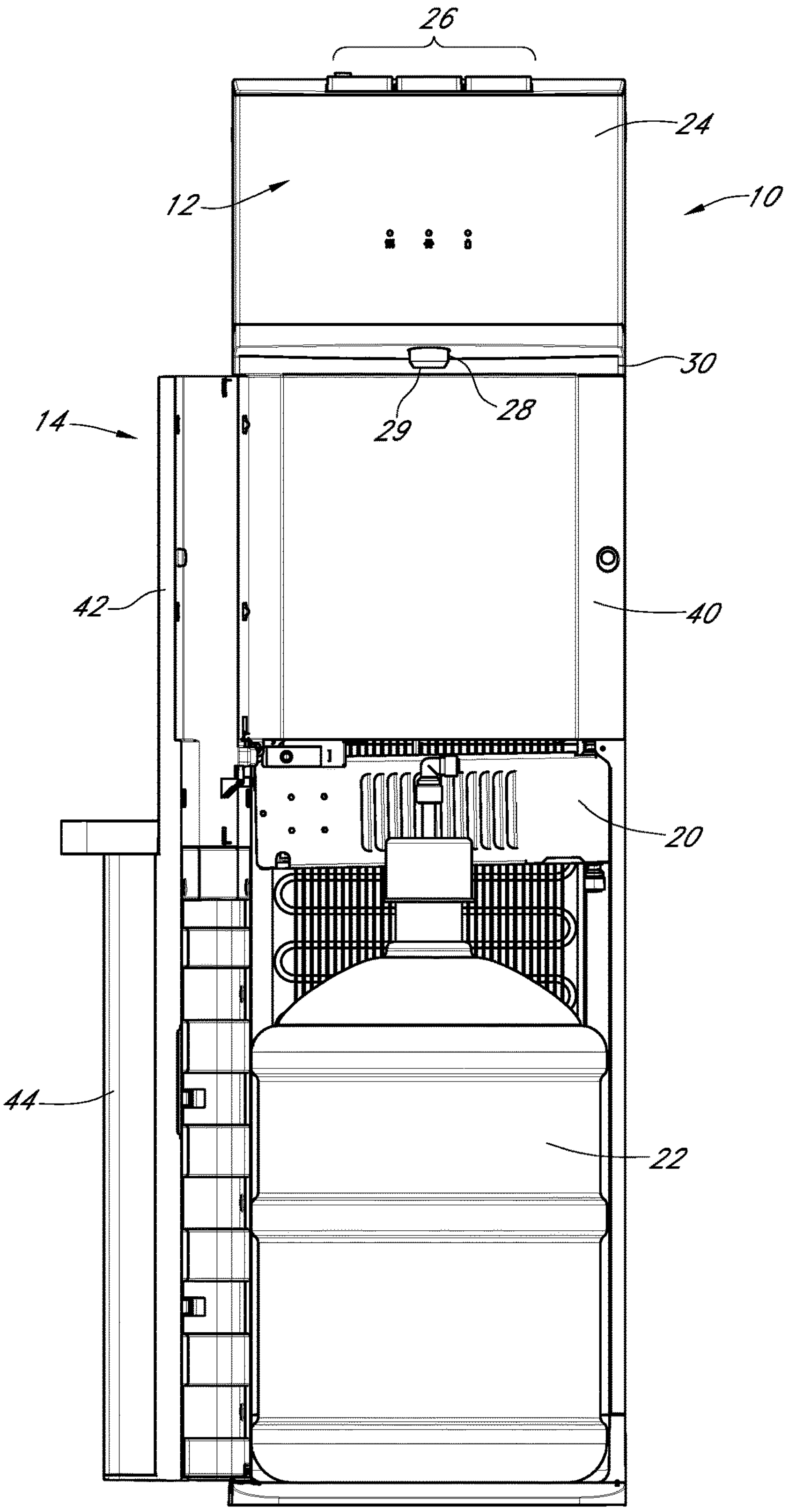
FIG. 2B is a front view of a bottom loaded water dispenser of the present invention with the door open.
Figure 3:
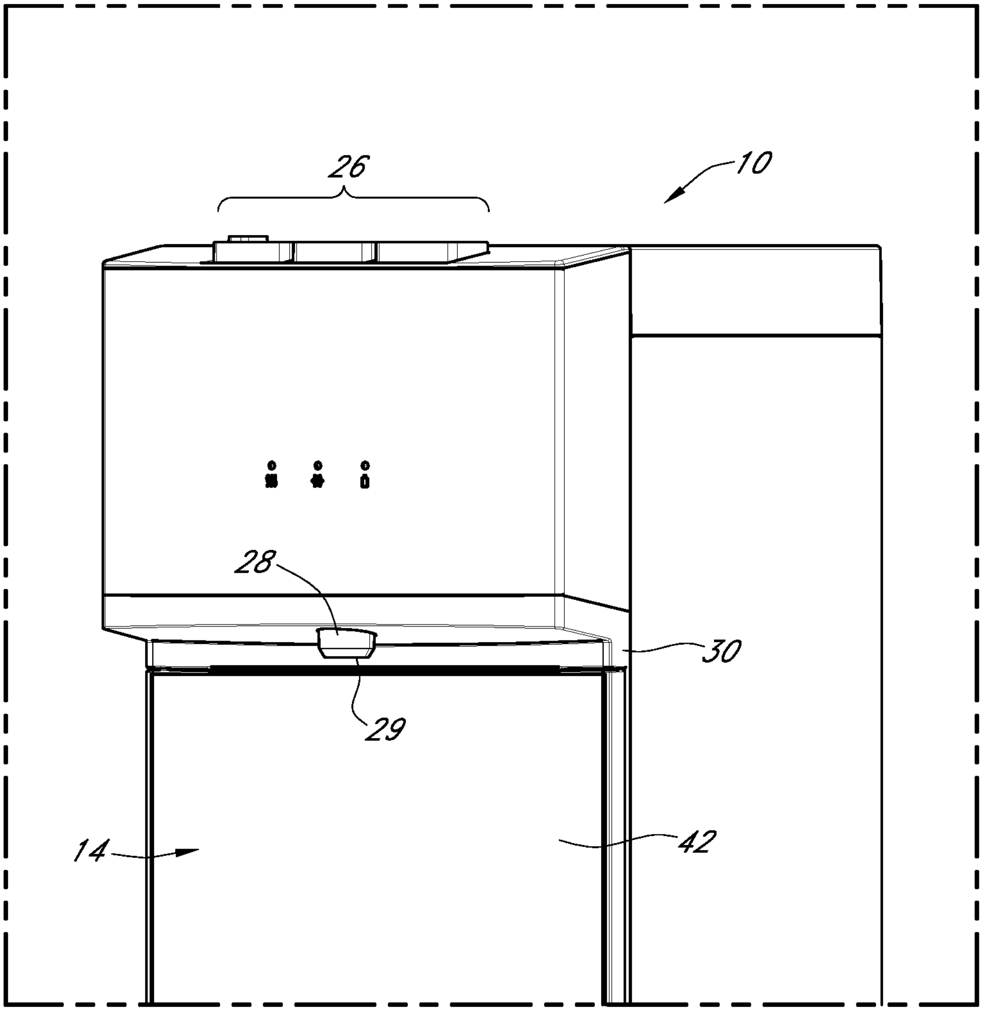
FIG. 3 is a partial perspective view of the top of the bottom loaded water dispenser of the present invention.
Figure 4:
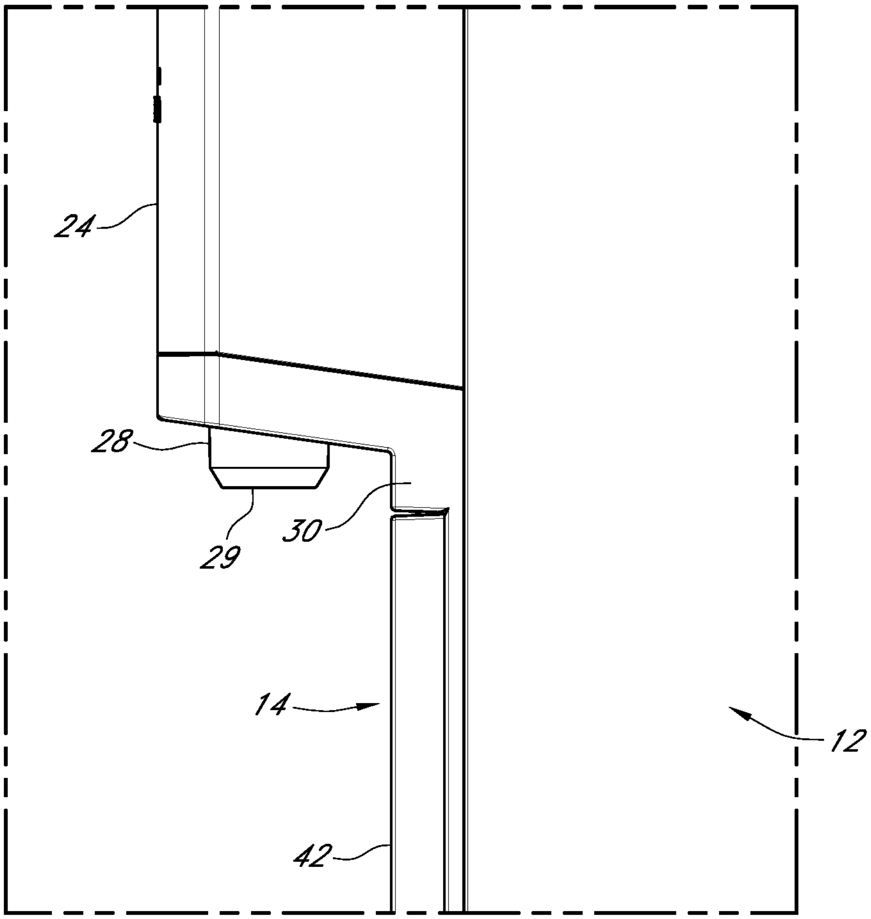
FIG. 4 is a partial side view of the top of the bottom loaded water dispenser of the present invention.
Figure 5:
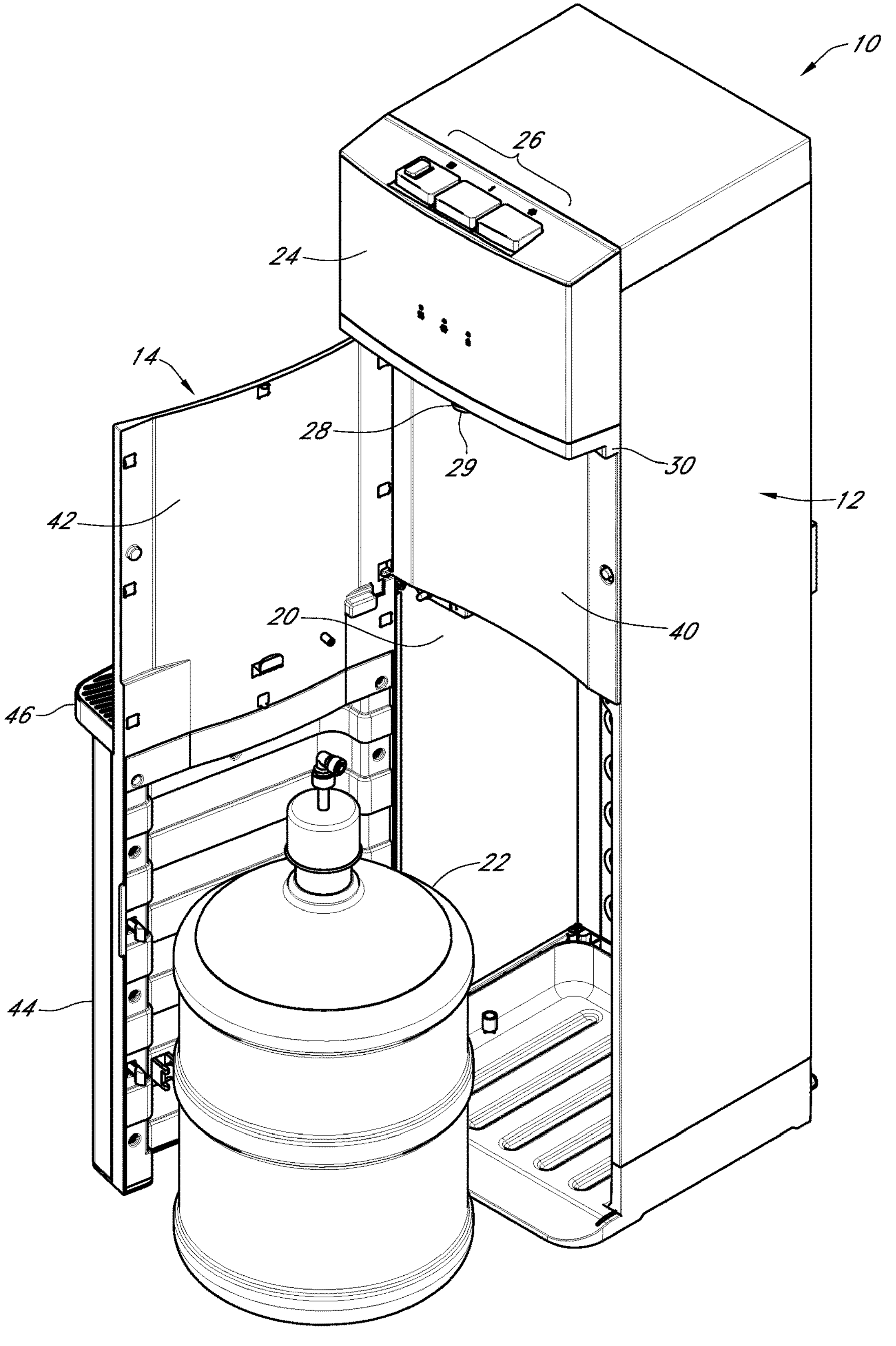
FIG. 5 is a perspective view of a bottom loaded water dispenser of the present invention with the door open, and illustrating a water bottle being removed.

Referring to FIGS. 2A, 2B and 5, in operation, a water bottle 22 is inserted into the interior space 20 of the housing 12. The water bottle 22 is connected to the operating components 16. The door 14 is then closed, concealing the water bottle 22 behind it (FIGS. 1A, 1B) and since the entire door 14 fits into the recess 40 of the housing 12, there is no seam showing at the edge of the interior space 20. The adjustable tray 46 has been set at the desired height to accommodate whatever size bottles need to be accommodated during filling. With the door 14 closed, a user of the water dispenser 10 may insert a large refillable bottle or other container into the elongated dispensing height 50, underneath the nozzle 28, to fill the user's bottle or container with water.

Referring to FIG. 5, when the water bottle 22 is empty, the user of the dispenser 10 opens the door 14, disconnects the bottle 22 from operating components 16 and removes the water bottle 22 from the interior space 20. The user then inserts a new water bottle 22, connects it to the operating components 16 and closes the door 14. Again, in this closed configuration, because of the size of the door 14 and its engagement with the recess 40, no seam shows at the edge of the interior space 20.

Figure 6A:
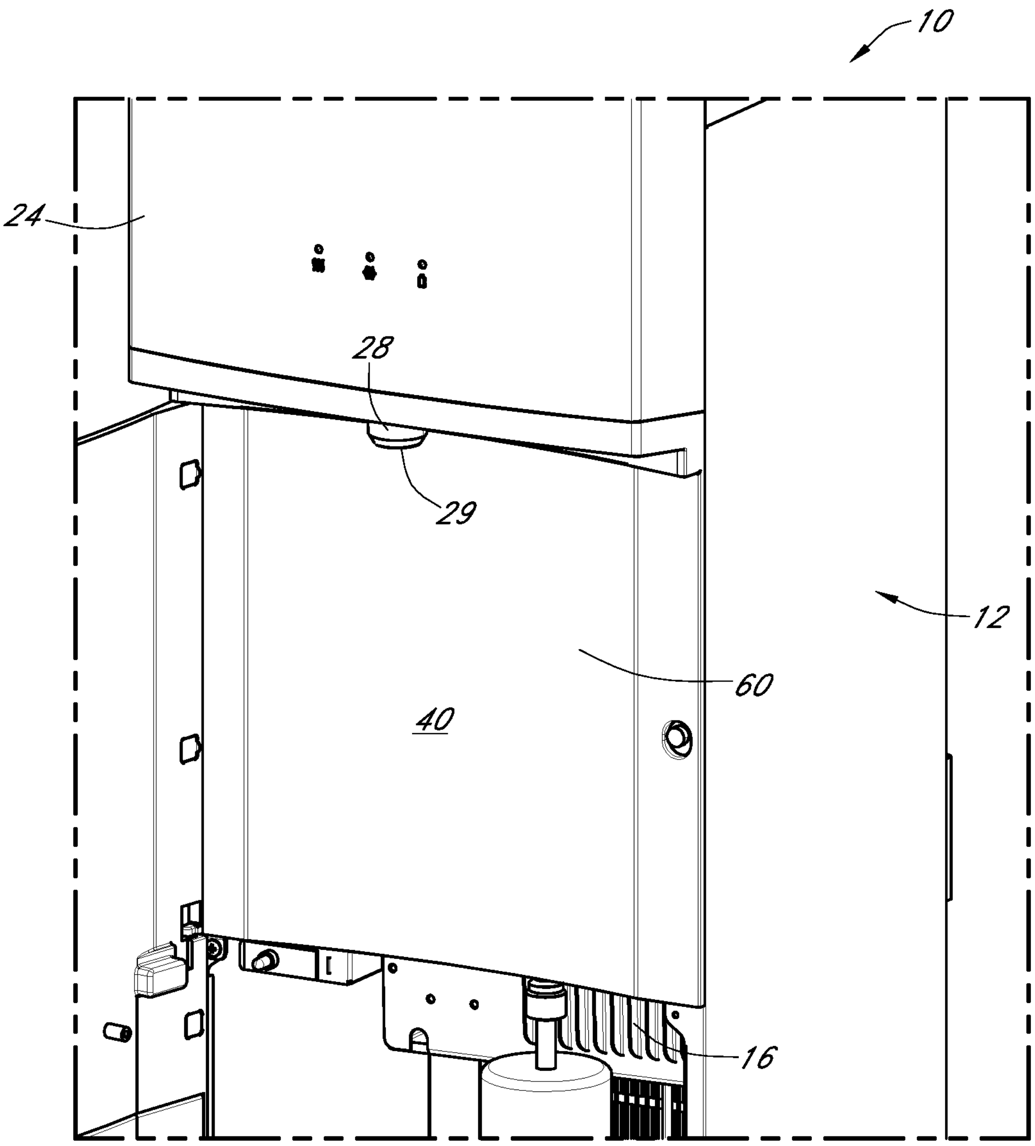
FIG. 6A is a partial perspective view of the top of an embodiment of a bottom loaded water dispenser of the present invention having an access panel.
Figure 6B:
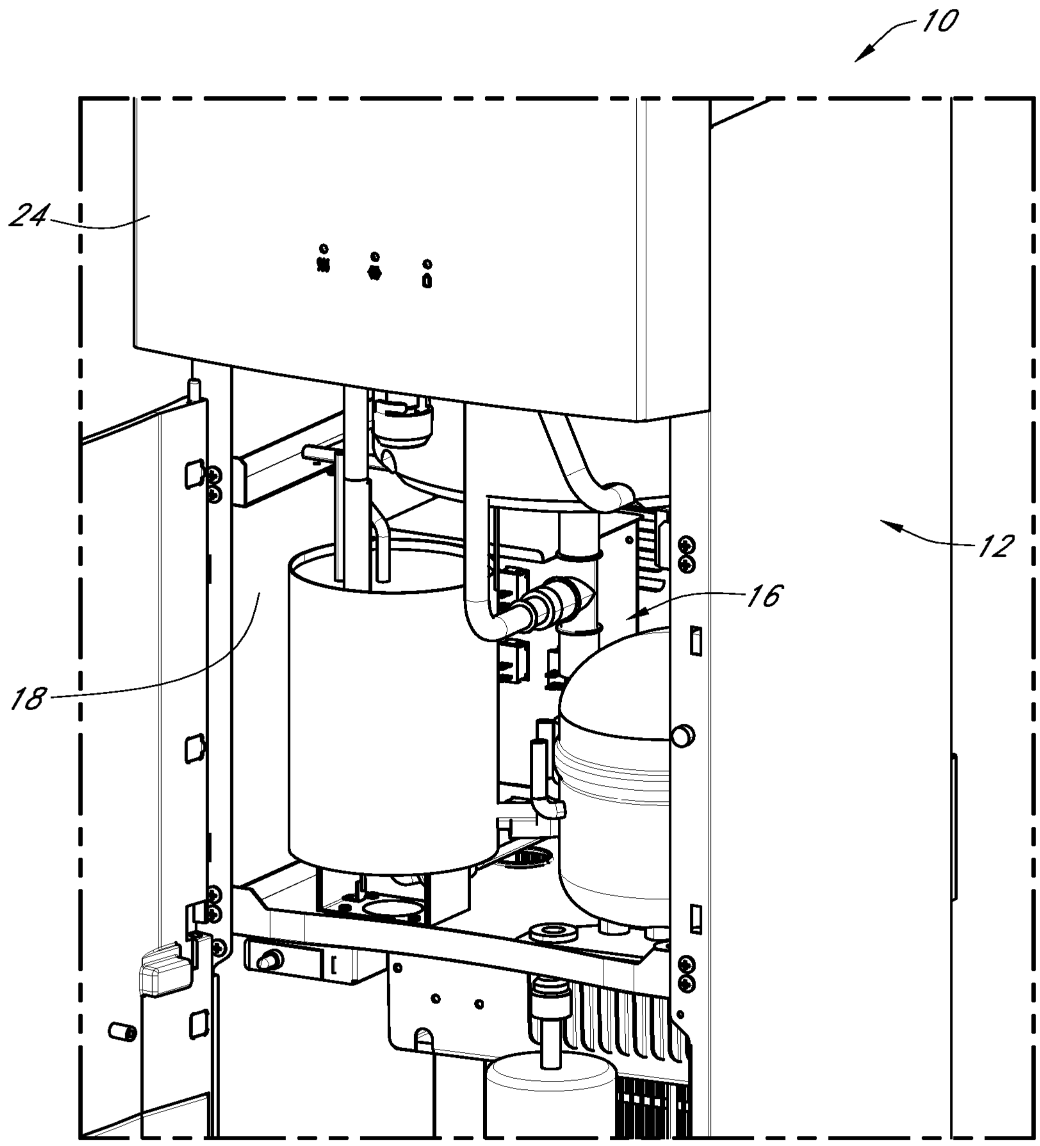
FIG. 6B is a partial perspective view of the top of the embodiment of the bottom loaded water dispenser of the present invention having an access panel with the access panel removed.

Referring to FIGS. 6A-6B, another embodiment of the water dispenser 10 of the present invention is depicted. In this embodiment, the housing 12 has an access panel 60 in the recess area 40 of the housing 12. In this embodiment, the access panel 60 allows a technician to remove the access panel 60 (FIG. 6B) to easily access the operating components 16 if they need to be serviced or repaired. With present coolers that do not have a door 14, it is very difficult, if not impossible, for a service technician to access the operating components 16. The access panel 60 also serves the purpose of preventing the water dispenser user from seeing and touching the operating components 16, which could cause injury. Further, the door 14 allows access panel 60 to be used without ruining the aesthetic of the water dispenser 10 because when the door 14 is in the closed position, the access panel 60 cannot be seen by the water dispenser user.

Figure 7A:
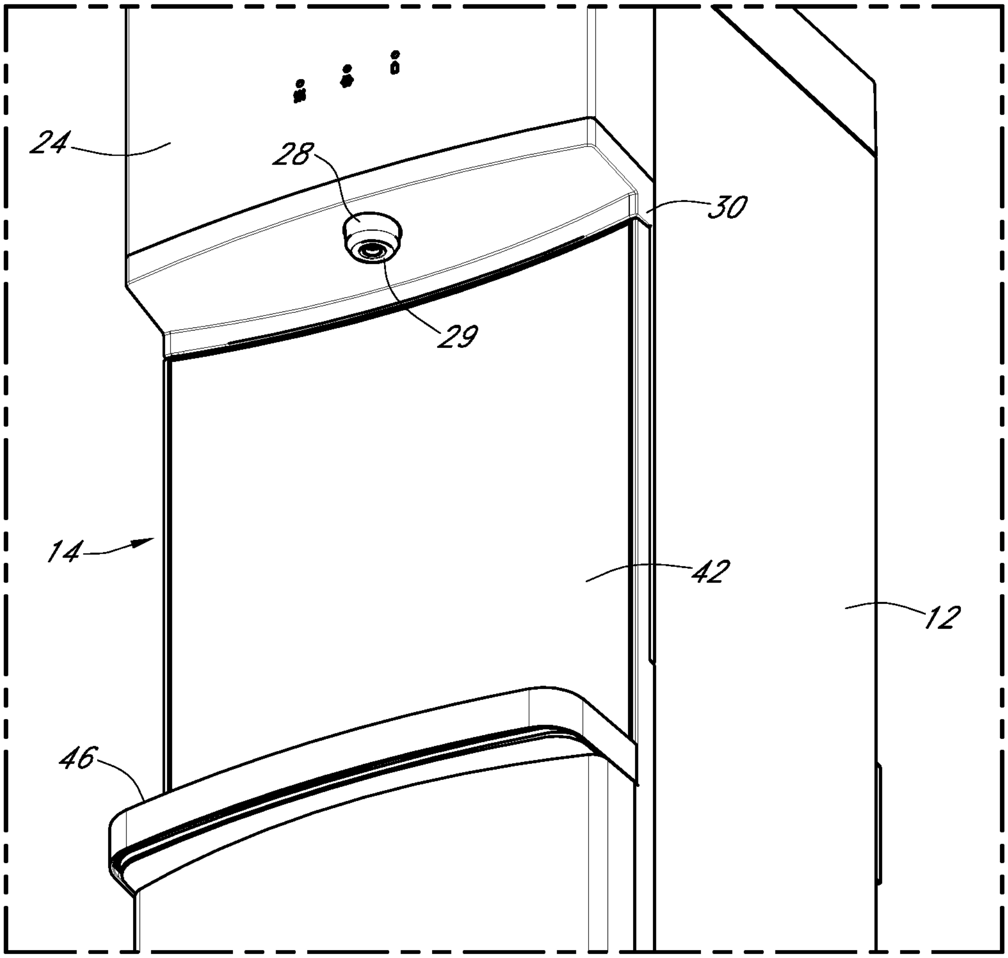
FIG. 7A is a partial perspective view of the top of an embodiment of a bottom loaded water dispenser of the present invention where the door of the water dispenser is curved.
Figure 7B:
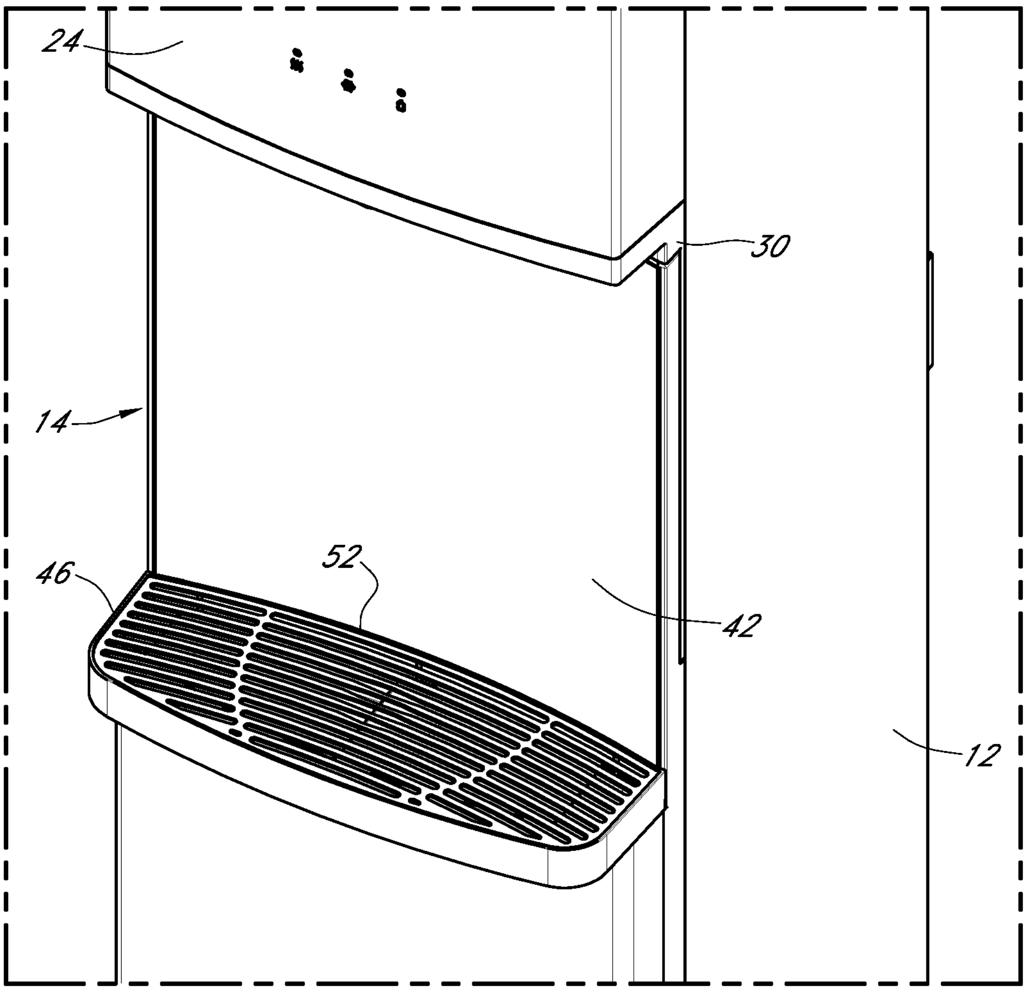
FIG. 7B is another perspective view of the top of the embodiment of a bottom loaded water dispenser of the present invention where the door of the water dispenser is curved.

Referring to FIGS. 7A-7B, a further embodiment of the water dispenser 10 of the present invention is depicted. In this embodiment, the door 14 is curved towards the back of the housing 12 as indicated at 52 (FIG. 7B). This curvature maximizes the distance from the end tip 29 of the nozzle 28 to the door 14, allowing a dispenser user to use a variety of containers having a large width, including those with a wide top or a wide base.

Although certain embodiments and features of a bottom loaded water dispensing device have been described herein, the scope of coverage of this patent is not limited thereto. On the contrary, this patent covers all embodiments of the teachings of the disclosure that fairly fall within the scope of permissible equivalents.

What is claimed is:

1. A bottom loaded water dispenser with an elongated dispensing area, comprising:

a housing having a dispensing nozzle, a front side and a lower portion; wherein the nozzle has an end tip and wherein a recess is formed in the front side of the housing behind the dispensing nozzle and below the dispensing nozzle end tip and wherein an opening is formed in the lower portion of the housing to receive a water bottle;

a door connected to the housing having a drip tray; wherein the door is moveable between an open and closed position and wherein the recess formed in the front side of the housing is approximately equal to the thickness of the door, such that in the closed position, the door fits in the recess and the top of the door is below the end tip of the dispensing nozzle.

2. The bottom loaded water dispenser of claim 1, wherein the drip tray is adjustable.

3. The bottom loaded water dispenser of claim 1, wherein the housing, further comprises a lower lip portion that defines the top of the formed recess and abuts the top of the door in the closed position.

4. The bottom loaded water dispenser of claim 3, wherein the housing is comprised of several components and the lower lip portion is a component that is separate from the other component.

5. The bottom loaded water dispenser of claim 1, wherein the door is connected to the housing with hinges.

6. The bottom loaded water dispenser of claim 1, wherein the housing includes an access panel.

7. The bottom loaded water dispenser of claim 1, wherein the door is curved.

8. A bottom loaded water dispenser with an elongated dispensing area, comprising:

a housing having a dispensing nozzle, a front side and a lower portion; wherein the nozzle has an end tip and wherein a recess is formed in the front side of the housing behind the dispensing nozzle and below the dispensing nozzle end tip and wherein an opening is formed in the lower portion of the housing to receive a water bottle;

a door connected to the housing having an adjustable drip tray; wherein the door is moveable between an open and closed position and wherein the recess formed in the front side of the housing is approximately equal to the thickness of the door, such that in the closed position, the door fits in the recess and the top of the door is below the end tip of the dispensing nozzle.

9. The bottom loaded water dispenser of claim 8, wherein the housing, further comprises a lower lip portion that defines the top of the formed recess and abuts the top of the door in the closed position.

10. The bottom loaded water dispenser of claim 9, wherein the housing is comprised of several components and the lower lip portion is a component that is separate from the other component.

11. The bottom loaded water dispenser of claim 8, wherein the door is connected to the housing with hinges.

12. The bottom loaded water dispenser of claim 8, wherein the housing includes an access panel.

13. The bottom loaded water dispenser of claim 8, wherein the door is curved.

14. A bottom loaded water dispenser with an elongated dispensing area, comprising:

a housing having a dispensing nozzle, a lower lip portion, a front side and a lower portion; wherein the nozzle has an end tip and wherein a recess is formed in the front side of the housing behind the dispensing nozzle and below the dispensing nozzle end tip and the lower lip portion defines the top of the recess and wherein an opening is formed in the lower portion of the housing to receive a water bottle;

a door connected to the housing having an adjustable drip tray; wherein the door is moveable between an open and closed position and wherein the recess formed in the front side of the housing is approximately equal to the thickness of the door, such that in the closed position, the door fits in the recess and the top of the door abuts the lower lip portion and is below the end tip of the dispensing nozzle.

15. The bottom loaded water dispenser of claim 14, wherein the housing is comprised of several components and the lower lip portion is a component that is separate from the other component.

16. The bottom loaded water dispenser of claim 14, wherein the door is connected to the housing with hinges.

17. The bottom loaded water dispenser of claim 14, wherein the housing includes an access panel.

18. The bottom loaded water dispenser of claim 14, wherein the door is curved.

* * * * *